United States Patent
Buerge et al.

(10) Patent No.: US 7,958,516 B2
(45) Date of Patent: Jun. 7, 2011

(54) CONTROLLING COMMUNICATION WITHIN A CONTAINER DOCUMENT

(75) Inventors: Michael Buerge, Seilerstrasse 13 (CH); Bernhard Seefeld, Wuhrstr. 32 (CH)

(73) Assignee: Google Inc, Mountain View, CA (US)

( * ) Notice: Subject to any disclaimer, the term of this patent is extended or adjusted under 35 U.S.C. 154(b) by 960 days.

(21) Appl. No.: 11/737,124

(22) Filed: Apr. 18, 2007

(65) Prior Publication Data
US 2008/0263566 A1    Oct. 23, 2008

(51) Int. Cl.
*G06F 13/22* (2006.01)
(52) U.S. Cl. ......... 719/318; 715/240; 715/742; 715/745
(58) Field of Classification Search ........................ None
See application file for complete search history.

(56) References Cited

U.S. PATENT DOCUMENTS

| | | |
|---|---|---|
| 2003/0037181 A1 | 2/2003 | Freed |
| 2005/0050021 A1* | 3/2005 | Timmons .......................... 707/3 |
| 2005/0055458 A1* | 3/2005 | Mohan et al. ................. 709/238 |
| 2005/0102364 A1 | 5/2005 | Ozzie et al. |
| 2006/0053224 A1* | 3/2006 | Subramaniam ................ 709/227 |
| 2006/0149758 A1 | 7/2006 | Ormstein et al. |
| 2006/0265396 A1 | 11/2006 | Raman et al. |
| 2007/0067411 A1 | 3/2007 | Angelov |
| 2007/0113237 A1* | 5/2007 | Hickson ......................... 719/318 |
| 2007/0299857 A1* | 12/2007 | Gwozdz et al. ................ 707/102 |

OTHER PUBLICATIONS

PCT International Search Report and Written Opinion, PCT/US08/60636, Sep. 4, 2008, 8 Pages.
Supplementary European Search Report, Euroepan Patnet Application No. EP 08746117, Jun. 9, 2010, 3 Pages.

* cited by examiner

*Primary Examiner* — H. S. Sough
*Assistant Examiner* — Syed Roni
(74) *Attorney, Agent, or Firm* — Fenwick & West LLP

(57) ABSTRACT

A system allows modules associated with different domains to communicate, such as within a container document. To transfer payload data from the first module associated with a first domain to a second module associated with a different domain, the first module adds the payload data as a text string to the URL of a transport module associated with the second domain. This way, the second module may directly access the modified transport module to obtain the payload data from its URL. The second module may likewise add other payload data as a text string to the URL of another transport module associated with the first domain, thereby enabling communication from the second domain to the first.

11 Claims, 4 Drawing Sheets

CONTROLLING COMMUNICATION WITHIN A CONTAINER DOCUMENT

CROSS REFERENCE TO RELATED APPLICATIONS

This application is related to co-pending U.S. application Ser. No. 11/456,703, filed Jul. 11, 2006, which is incorporated by reference in its entirety.

BACKGROUND

This invention relates generally to controlling communication within a container document.

Many browsers prevent code that is hosted on one domain from accessing code that is hosted on a different domain. Where a document is hosted on one domain and references content hosted on a different domain, the document is typically precluded from communicating with or accessing the content on the different domain. Such a situation may arise on a portal web page, for example, which is designed to allow a user to select a restaurant from a frame hosted by a city guide domain and then cause directions to the selected restaurant to be generated in a frame that is hosted by a mapping domain. Direct communication between the frames hosted by the different domains is typically disallowed, due in part to security restrictions and other limitations of the existing browser programs.

SUMMARY

To allow communication between modules associated with different domains (such as when presented within a container document), various embodiments of the present invention provide mechanisms to work around the limitations of existing browser programs. A system allows modules associated with different domains to communicate, such as within a container document. To transfer payload data from the first module associated with a first domain to a second module associated with a different domain, the first module adds the payload data as a text string to the URL of a transport module associated with the second domain. This way, the second module may directly access the modified transport module to obtain the payload data from its URL. The second module may likewise add other payload data as a text string to the URL of another transport module associated with the first domain, thereby enabling communication from the second domain to the first.

In one embodiment, the first and second modules create inline frames, or IFRAMES, contained within a container document, which may implement a web portal. Each transport frame may also be an empty IFRAME that is hidden in the container document.

In another embodiment, the second module polls a transport module to determine whether data has been transferred to the second module. This polling may be periodic or otherwise determined according to an algorithm. In this sense, the data transport mechanism may be asynchronous.

Beneficially, communicating the payload data via the URL of a transport module may allow the cross-domain communication without requiring communication between the corresponding servers, as the communication may occur entirely at the client machine on which the browser program and modules are executed.

Figure 1:
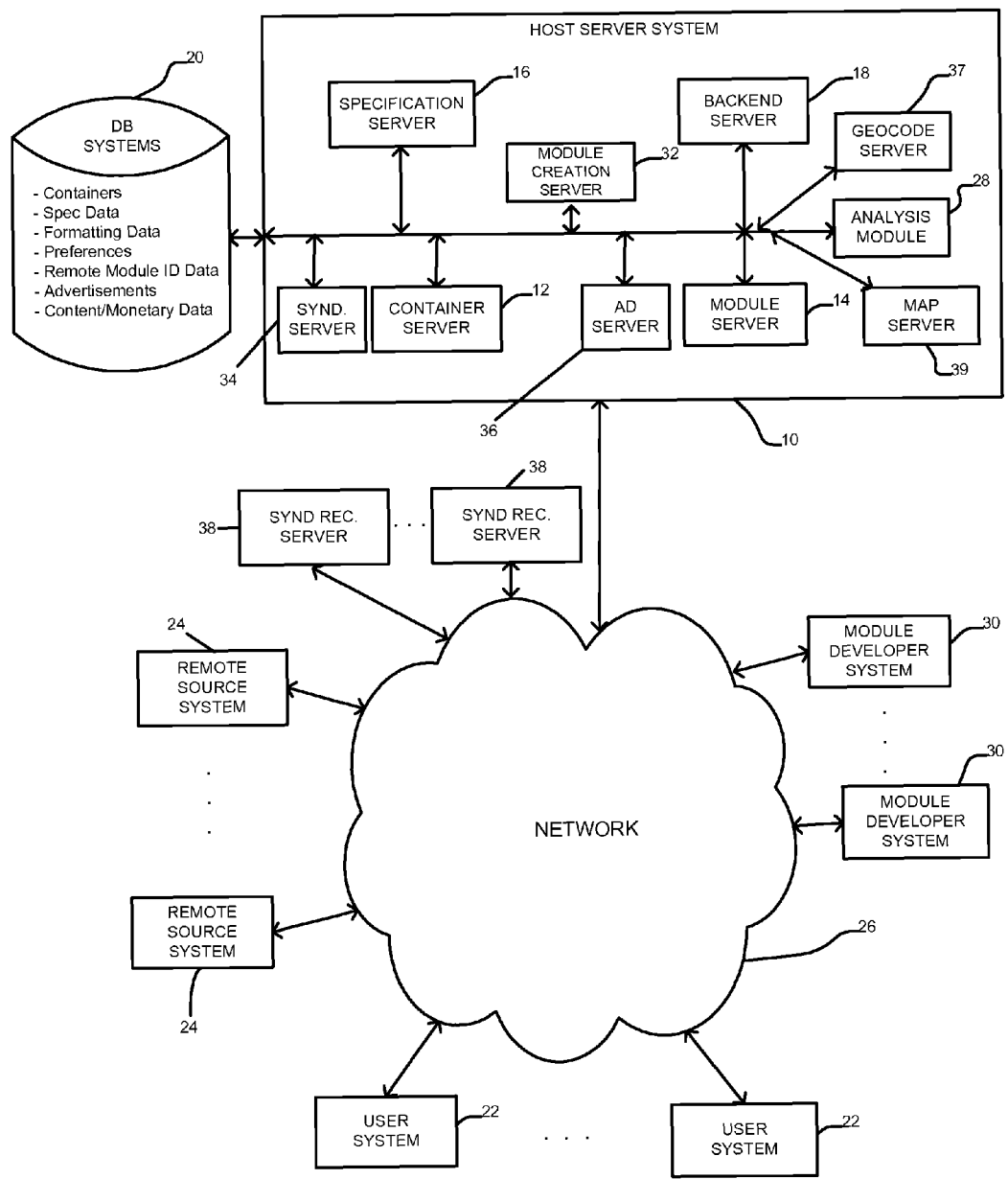
FIG. 1 is a block diagram of an overall container document system architecture for providing content to a user via a container document, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Exemplary embodiments are discussed in detail below. While specific exemplary embodiments are discussed, it should be understood that this is done for illustration purposes only. A person skilled in the relevant art will recognize that other components and configuration can be used without departing from the spirit and scope of the claimed inventions. Various embodiments of the present invention relate to controlling communications within a container document.

Illustrative Container Document Environment for Use of Embodiments

One illustrative example of a container document may be such as one used in connection with a personalized portal size. A personalized portal site (e.g., My Yahoo!, start.com, or Google Personalized Homepage) may allow the user to select only content (e.g., interactive, read-only, updating, data feeds, etc.) to display on a personalized page, such as a new email alerts, current weather and/or traffic conditions, movie show times, horoscopes, etc. According to one embodiment of the present invention, the illustrative example of using modules may involve modules that may be incorporated into a personalized portal page (one example of a container document) along with modules developed (e.g., by an a third party developer) for inclusion in the container.

Therefore, for illustrative purposes, an explanation of the container documents or modules is provided here, but it should be appreciated that the various embodiments may be employed in connection within other contexts as well. In addition, details regarding the modules are provided in detail in four co-pending and commonly assigned patent applications, all of which are hereby incorporated by reference in their entirety. Such application are: U.S. patent application Ser. No. 11/298,930, filed Dec. 12, 2005, and entitled "Remote Module Incorporation into a Container Document"; U.S. patent application Ser. No. 11/298,922, filed Dec. 12, 2005, and entitled "Module Specification for a Module to be Incorporated into a Container Document"; U.S. patent application Ser. No. 11/298,987, filed Dec. 12, 2005, and entitled "Customized Container Document Modules Using Preferences"; and U.S. patent application Ser. No. 11/298,988, filed Dec. 12, 2005, and entitled "Proxy Server Data Collection."

While details are provided in this application, in general, such a system may be understood by the following.

The system may comprise a number of components. The system may comprise a container server that serves a container document (e.g., a personalized page). The container document "contains" one or more modules, including one or more remote modules. As used herein, the term "container document" or "container" should be understood to include a personalized homepage of a website, a sidebar, toolbar element that incorporates one or more such modules, a page hosted by a site, a document capable of rendering modules (e.g., any document capable of rendering HTML code or XML code) in the format of the module (e.g., XML). Also, the container may be a website of another entity that incorporates the modules when supplied the modules through a syndication system.

As used herein, the term "module" may be understood to refer to a piece of software and/or hardware that renders data for use in a container document. Modules may be personalized to user preferences, preferences of the container, preferences of the environment or other inputs. In an exemplary embodiment, various modules may or may not be visible to the viewer of the container document. A module specification may be understood to include a set of instructions used to render data for the container document using elements that have been predefined.

Overview and System Architecture of Container Document System

FIG. 1 depicts an overall system diagram in which the communication embodiments may be employed according to one embodiment of the present invention. As illustrated, FIG. 1 may comprise a host server system 10 with a plurality of modules that may be associated therewith. Such modules may comprise a container server 12, a module server 14, a specification server 16, a backend server 18, an analysis module 28, a module creation server 32, a syndication server 34, an advertisement server 36, a geocode server 37 and a map server 39. As illustrated, personalized container server 10 may connect over a network 26 to a plurality of systems.

Other systems connected to the network may comprise one or more user systems 22, one or more remote source systems 24, one or more module developer systems 30 and one or more syndication recipient servers 38. In addition, one or more database systems 20 may operate in conjunction with the various modules of host server system 10.

Container server 12 may serve the container document to user systems 22 over network 26. Container server 12 may comprise a web server or related server systems that takes data and/or instructions and formulates a container for transmission over the network to the user system 22. It should be appreciated, however, that container server 12 may reside on user system 22 as well so that a network connection may not be used. In the example in which the container document comprises a word processing document, for example, container server 12 may comprise a word processing module.

Module server 14 may provide data from modules to container server 12 for incorporation into a container document. It should be appreciated that in one embodiment, container server 12 and module server 14 may comprise a single unit performing both functions. Module server 14 may provide data for the container document by interpreting and/or parsing instructions in the module specification associated with the module. According to one embodiment, module server 14 may serve the module content to the container document through the use of a browser inline frame (IFRAME). An IFRAME may be generally understood to be an independently operated browser window instance inside the container document. One advantage of an IFRAME is that is protects the container document from the IFRAME's content and vice versa, e.g., JavaScript on the container document may not be permitted to access any JavaScript code in the inner IFRAME (same for CSS, DOM, or cookie objects). In an exemplary embodiment, this failure to permit access to any JavaScript code in the inner IFRAME may be the result of security settings of the browser.

To expedite display of container documents, modules may be displayed inline within the container document. Inline display may be understood as referring to display with other document elements. One example is a display generated from code for HTML in the body according to HTML standards. In one embodiment, module server 14 or some other component may determine whether the module is deemed trusted before including it in the container document inline due to the risks of various security issues an inline module could create. According to one embodiment, the module may incorporate an indicia of approval (e.g., digital certificate) issued by the container module or an entity associated with the container module as described in detail below. If the indicial of approval is present, module server 14 may render the data from a module for inline presentation in the container document.

Specification server 16 provides the module specification file to module server 14. The module specification may be cached and stored in a database accessible to the module server 14 and/or specification server 16 or may be retrieved from a location associated with the specification as detailed later. For example, specification server 16 may reside on a remote source system 24. In addition, specification server 16 may be connected to module server over a network with the module specification located at another location on the network accessible to specification server 16.

Backend server 18 may be provided for interacting with one or more databases (e.g., large or dynamic databases of information). For example, for a news module that obtains frequent updates and demands a flow of data, (e.g., from an RSS feed), backend server 18 may format the data into HTML for the container.

In one specific example, a person may create a module (e.g., a maps module), such as one that uses an application program interface (API) to an existing mapping program to create a module to display a map of downtown Mountain View, Calif. The module may comprise an XML specification file or module specification file stored on a specification server. The specification server may comprise any server, including one on the site from which the container page is hosted or any other site. The user or another person may then include this new module on a personalized homepage (container document). The server that serves the container document may operate as the module server and the server that generates the mapping data through an inquiry from its API may be considered to be the backend server.

According to one embodiment of the present invention, analysis module 28 may analyze modules at various times (e.g., when the module is first selected by a user, each time the module is called by a container for inclusion or at any other time determined to be advantageous for safety and security and other times). Analysis module 28 may perform a number of actions, including comparing the module with a list of disapproved or dangerous modules or a list of approved modules. The comparison may involve exact or substring (e.g., prefixes, suffixes and regular expressions) matching by name or location (e.g., URL), contents of the specification, contents of the location where the specification resides, or information that may be ascertainable about the module. Analysis module 28 may take one or more actions in response to a determination that the module is disapproved or dangerous, including, for example, silently blocking the request, (i.e., providing a generic error), blocking the request with an error that explains the reason it was blocked or redirecting the request to a different module specification that has been determined to be safe and related to the disapproved module (e.g., another module that relates to maps, if the first one was a disapproved mapping site or a module that includes the keyword "basketball" if the disapproved module was a basketball module). For example, through redirection, the URL of the original module may be passed to the "safe" module. The safe module may then use a proxy server, as described below, to retrieve the original URL's content. Developers may then replace the error handler to fix small bugs in the original module to be able to display the content of the original module. In another embodiment, analysis module 28 may parse the module content to determine whether it is safe, such as by compiling JavaScript or other scripts contained in the module to try to identify unsafe or undesired actions the module may perform.

One or more module creation servers 32 may be provided. This server may operate as a "wizard" to enable module creators to create a module through an interactive process controlled by module creation server 32. For example, module creation server 32 may provide a series of user interfaces that enable the module creator to provide inputs that are then used by the module creator to automatically generate a module specification. For example, various module specification templates may be provided with corresponding inputs. Module creation server 32 may then take inputs supplied by a module creator, insert them into the template and then generate the module specification for the module. A preview, testing and debugging function may also be offered as part of this "wizard." This module may be downloadable as well so it may be installed and operated at any node on the network.

A syndication server 34 may prepare data for transmission to one or more syndication recipient servers 38 related to modules. Syndication server 34 may receive a request for a module and/or module content and deliver that module or content to a syndication recipient server 38 over network 26. Syndication server 34 may reside at host server system 10 or at another location on the network. For example, if an operator of a sports web site (an example of a syndication recipient system 38) desired to include a maps module created by a remote source system 24, it may do so through a request to syndication server 34. Syndication server 34 may then cooperate with module server 14 to generate data for the container document (here the sports web site page of the syndication recipient system 38). That may involve retrieving the module specification from remote source system 24, supplying preferences received from the syndication recipient server 38 (e.g., city information for the sports team of a page being displayed) and/or generating data for the container. It is also possible that the data may be rendered at syndication recipient server 38 into its container document in either an IFRAME or inline. Syndication server 34 may thus syndicate modules accessible to it. It may do so based on requests for specific modules or other criteria it determines (e.g., content matches, keyword matches, monetary values associated with modules and/or syndication requesters, etc.)

Ad server 36 may provide advertisements associated with modules to containers. For example, an advertisement may be incorporated with module data when data is delivered to a container document. Ad server 36 may operate with syndication server 34 to deliver advertisements to syndication recipient servers 38 based on a syndication request for a module. The advertisements may be selected by ad server 36 based on a wide variety of criteria, including, but not limited to, the relationship between the content of or information about the container, module, other modules in the container, syndication recipient server information, monetary elements/relationships related to any of the foregoing and/or combinations thereof. Ad server 36 may comprise the Google AdSense system, according to one embodiment of the present invention. Ad server 36 may operate as described in one or more of the following patent applications, the subject matter of which is hereby incorporated by reference in their entirety. Specifically, ad server 36 may manage online advertising by associating two or more concepts related to a module with an advertisement and associating a bid, collectively, with the two or more keywords in the manner discussed in the context of serving advertisements with electronic documents in U.S. patent application Ser. No. 10/340,193, filed on Jan. 10, 2003, entitled "Pricing Across Keywords Associated with One or More Advertisements," which is incorporated by reference herein in its entirety. Additional examples of presenting advertisements and managing advertising costs are discussed in U.S. patent application Ser. No. 10/340,543, filed on Jan. 10, 2003, entitled "Automated Price Maintenance for Use With a System in which Advertisements are Rendered with Relative Preferences," and U.S. patent application Ser. No. 10/340,542, filed Jan. 10, 2003, entitled "Automated Price Maintenance for Use With a System in which Advertisements are Rendered with Relative Preference Based on Performance Information and Price Information," which are incorporated by reference herein in their entirety.

A geocode server 37 may be provided to generate geocode information from location descriptions as is known in the art. A geocode server 37 may generate latitude and longitude numeric values from geographic locations.

A map server 39 may generate map output. Mapping systems, such as Google Maps and Google Earth, may be used to generate this data.

One or more database systems 20 may be provided that store, in any number of ways, container information, module specifications and/or related information, formatting data, per-user and per-module preference data, remote module ID data, remote module location reference data, advertisement data, advertiser data, content/monetary data, syndication recipient data, templates for modules, inputs for modules, lists of trusted and untrusted modules, approval criteria and related information and/or any other information used by the modules to operate as described herein. While a single database structure is shown, it is well understood that the data may be stored at a number of locations and in one or more systems.

While one configuration is shown in FIG. 1, it should be appreciated by one of ordinary skill in the art that other configurations of these various modules may also be possible. For example, the various modules depicted within host server system 10 may be disposed at various locations around network 26 or at various points on several networks. In addition, whereas a single host server system 10 is depicted, it should be appreciated that any number of each of the modules depicted on FIG. 1 may be provided including network 26.

In one embodiment, network 26 may comprise the Internet. Other networks may also be used for connecting each of the various systems and/or servers.

In addition, what is shown as user system 22 may also operate as a remote source system 24 and/or a module developer system 30. In other words, one computer system may operate in different capacities: as a user system, as a remote source system, as a syndication server, as a target content server, and/or a module developer system. In addition, as explained in greater detail below, each of the modules depicted within host server system 10 may also be disposed at a user system 22, a remote source system 24, or a module developer system 30. Similarly, databases 20 may be associated with each of the modules depicted within FIG. 1 depending upon the configuration desired.

Container Document Including Modules

According to one embodiment of the present invention, systems and method are provided to incorporate modules into a container document. One example of a container document would be a personalized home page, such as the Google Personalized Homepage currently available to users of the Google services on the Internet. Instead of restricting the types of content that a user is able to include in a container document such as a personalized home page, one or more embodiments of the present invention enable users to select modules from sources other than the source of the container document. So, for example, a user may elect to include a module in his or her personalized Google home page from a source not associated with Google.

Figure 2:
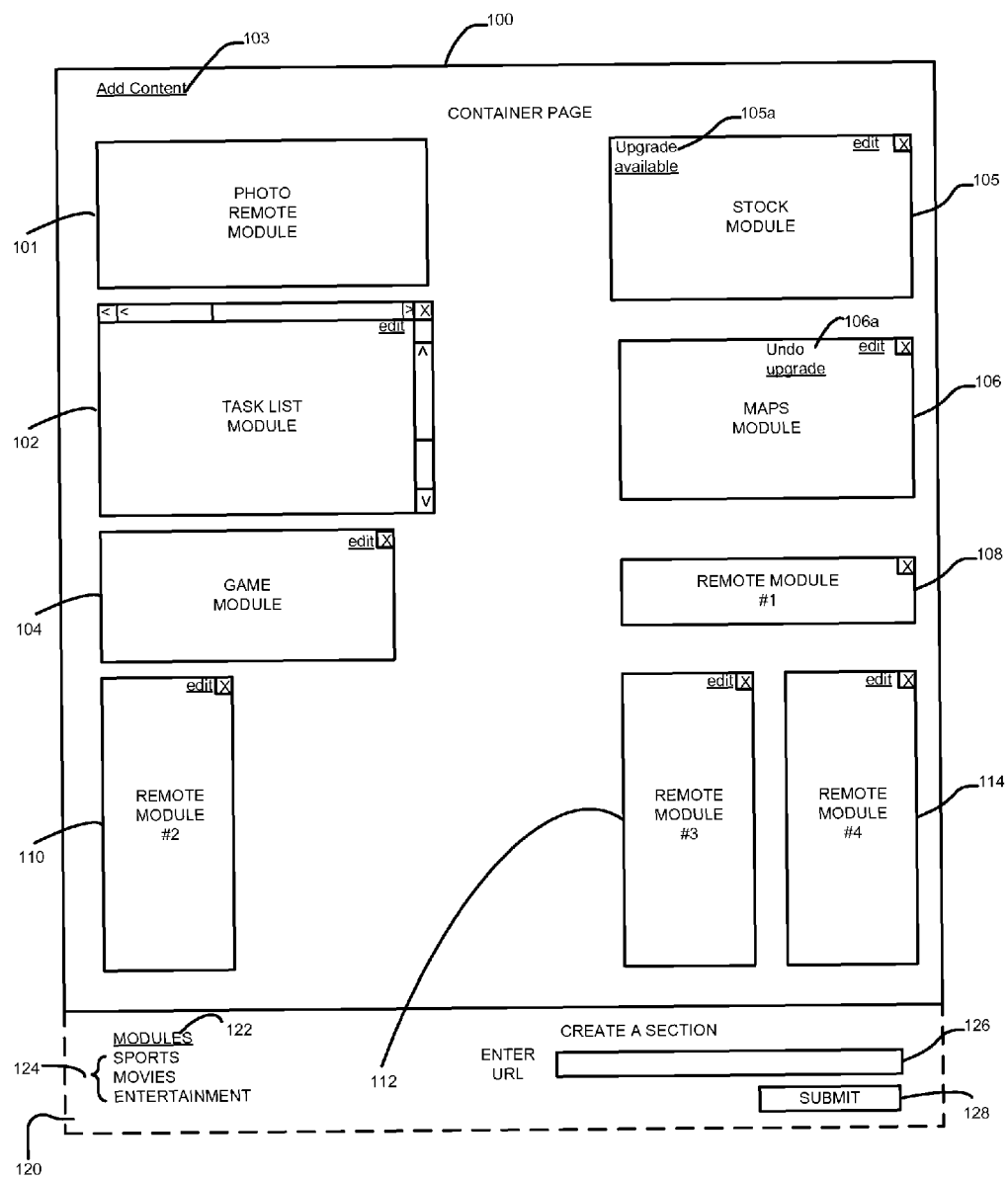
FIG. 2 depicts an illustrative container document, in accordance with an embodiment of the invention.

It should be appreciated that various forms of the container document may exist, but one such illustrative example is depicted in FIG. 2. FIG. 2 depicts a container page 100 with a plurality of modules that have been incorporated into the container document. A plurality of methods of incorporation are possible, including the use of the IFRAME and inline HTML techniques. These issues will be discussed in greater detail below. FIG. 2 depicts a plurality of modules including a photo remote module 101, a task list module 102, a game module 104, a stock module 105, a maps module 106, a remote module 108, a remote module 110, a remote module 112, and a remote module 114. Different formats for the various modules may exist depending upon the specifications provided by the creator of the module. As depicted, some modules may provide scroll bars, and others may not. Some modules may be different sizes or shapes than other modules. In addition, some modules may offer the opportunity for the user to edit the display preferences and/or per-use data associated with the module. (See, for example, modules 102, 104, 105, 106 and 110 that provide an edit link.) For example, if the module relates to a maps module 106, the user may be provided the opportunity to edit an address or addresses that are mapped in that module. In one embodiment, inlined modules may be automatically sized by a container document so no scrolling, height or scaling information may be provided. If a module developer wants the module to have these properties in this embodiment, an inlined module may be wrapped with a fixed size <DIV> tag and content placed in the tag. The scroll bar, height and other characteristics may be then specified for the inlined content. One of the attributes allows specifying scaling=" . . . " to let the developer indicate how a module may be scaled up or down for different sizes of placements in the container documents.

One of the functions provided with this example container document 100 is the opportunity to add content to the container page through selecting the add content element 103. Upon selecting "add content" element 103, the system may offer the user the opportunity to interactively indicate an additional element to be included in the container page. Various forms of an interface to receive that input may be provided. One illustrative form is presented in FIG. 2 toward the bottom of the page in section 120. In that section, the user may be presented with an interface element to select from a browsable list of modules that may be arranged into a categorization structure. Another section of input section 120 may enable the user to specify a reference to a location for a module to be incorporated into the container document. Such a section may be such as that depicted through an input box 126 with a submit element 128. In one illustrative example, the user may specify a location reference (e.g., the uniform resource locator (URL)) where data exists related to a module to be incorporated. As explained in greater detail below, one example of the data is an XML-based file that meets the scripting preferences of the operator of the container document system 10.

At its base level, the specification may comprise a plurality of elements including the XML version information, module preferences, which may be optional, user preferences, which may be optional, a content type designator and then a content element that is used to populate the portion of the container allocated for the module. It should be appreciated that the content may be specified in various forms of code, typically code that is interpretable by a user system when generating the container for presentation. Such code may include HTML, JavaScript, or other forms of code that may be used to depict the format of a web page.

According to another embodiment of the present invention, the module specification may be embedded in one or more other files or computer instructions. According to this embodiment, the module server 14 may, when provided with the identification of data for generating a module, look for a module specification within the data.

Transport Mechanism for Communicating Between Modules

According to exemplary embodiments, IFRAMEs may be used to control communication within a container document. As noted above, module content may be presented in an IFRAME hosted on a domain separate from the domain of the container server. In such an embodiment, policies may exist that prevent an IFRAME that may be hosted on the separate domain from communicating with and/or accessing the container server. One such policy, for example, may be referred to as the "Same Origin Policy."

In various systems, communication between modules and/or the container document may be controlled. For example, this communication may be controlled to limit access to the domain of the particular module or containing window that is trying to communicate.

As used herein, domain should be understood to be a source, such as a single DNS entry (e.g., www.google.com) or related DNS entries (e.g., all registrations with the base name www.google.com) or sometimes referred to as a trust domain. In addition, as used herein, the term module may refer to the container document itself or to another module that provides content to the user from another domain. Accordingly, communications can be controlled between modules within a container document and associated with different domains, or between the container document itself and a module associated with a different domain than the container document.

A module may reference a frame, which may be presented in a container document. In an exemplary embodiment, the container document and one or more other modules may each include code, for example, that references an IFRAME. A module may also include code for receiving a parameter. For example, the container document may include a script defining a "ProcessPayload" function that receives "payload" as a parameter. In such an embodiment, the "ProcessPayload" function may be any function that receives the "payload" and processes the "payload," where the "payload" represents a structure of a string of characters that can represent any value. While the "ProcessPayload" function may be included in the container document and any other module, it will be understood that the "ProcessPayload" function does not have to be defined within any particular module, and may be defined and/or executed elsewhere. Further, in an exemplary embodiment, the logic encapsulated by such a function may be executed separate from the function.

One or more of the modules in the container document may include a script (e.g., var iframe_1=document.createElement ("IFRAME")) to construct an IFRAME in the container document. The constructed IFRAME may include module content for displaying the module within the container document. In one embodiment, the modules construct one or more IFRAMEs upon the loading of the container document; however, and IFRAME may also be dynamically constructed.

Figure 3:
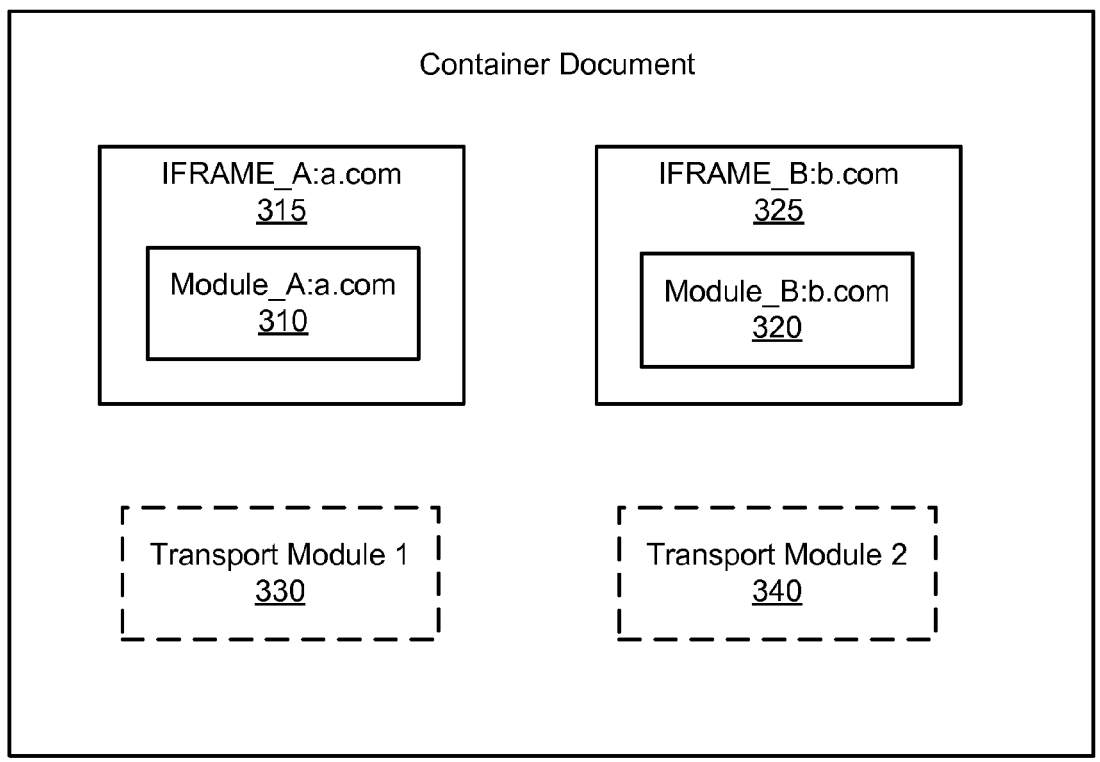
FIG. 3 illustrates a container document that includes functional modules and transport modules, in accordance with an embodiment of the invention.

FIG. 3 illustrates an example system in which modules from different domains can communicate within a container document. In this example, the container document creates IFRAME_A 315, which is associated with domain a.com, and IFRAME_B 325, which is associated with domain b.com. The container document then loads Module_A 310 into IFRAME_A 315 and Module_B 320 into IFRAME_B 325. In this way, the IFRAMEs 315 and 325 can be used for displaying and enabling user interaction with content from their associated domains. This avoids having foreign code (i.e., code from another domain) run in the scope of the container document, but rather encapsulated in an IFRAME.

The container document may further include a first transport module 330 and a second transport module 340, which may also be created upon loading of the container document, or they can be created dynamically. In one embodiment, the transport modules 330 and 340 are implemented hidden IFRAMEs that have no content or code therein.

Figure 4:
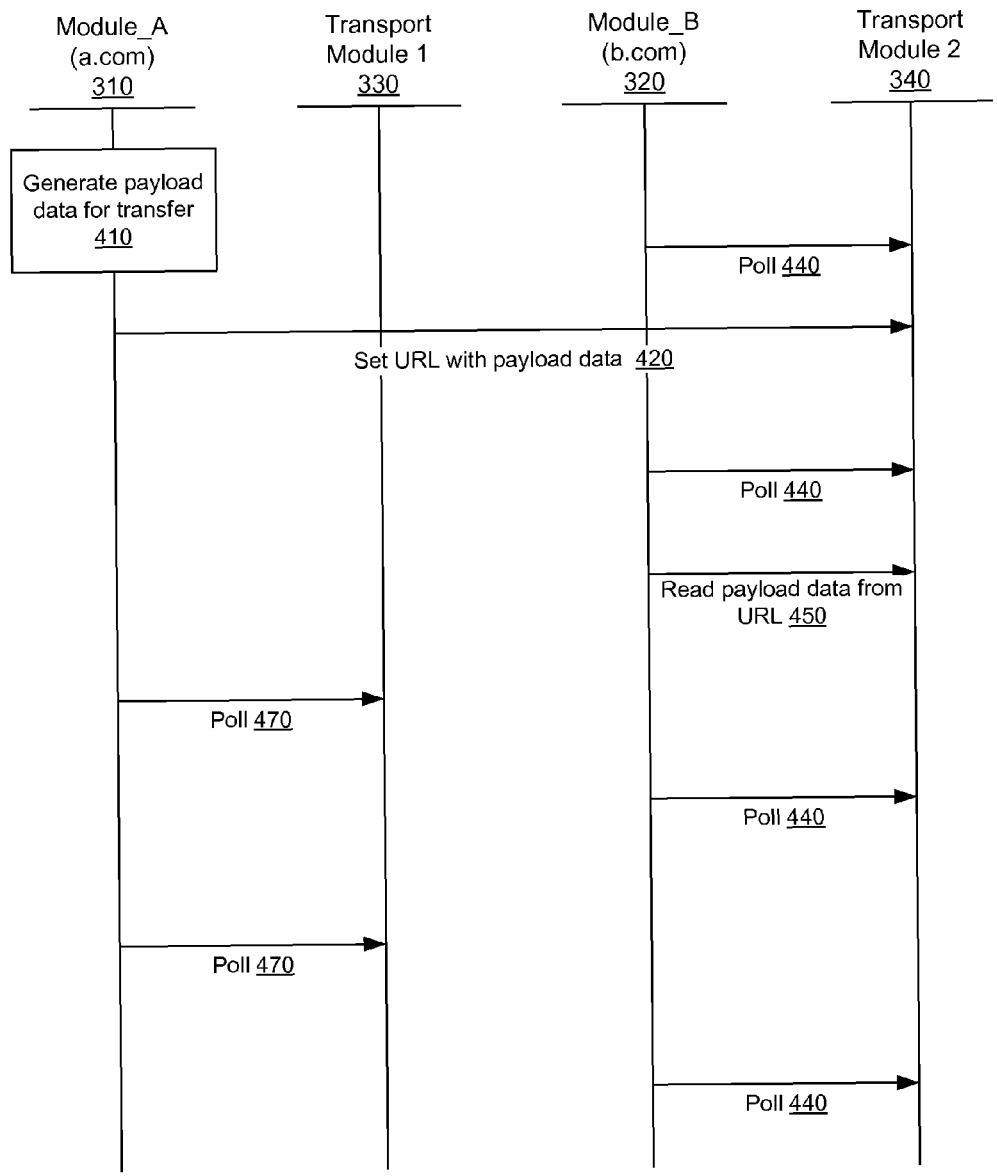
FIG. 4 is an interaction diagram of a process for communication within the container document of FIG. 3 between modules associated with different domains, in accordance with an embodiment of the invention.

With reference to the example system of FIG. 3, FIG. 4 illustrates a process for enabling communication within the container document between a module hosted on one domain (e.g., Module_A) and a module hosted on a different domain (e.g., Module_B). In this example, the first transport module 330 is associated with domain a.com, and the second transport module 340 is associated with domain b.com. In this process, Module_A 310 has generated 410 or otherwise obtained information to be communicated to Module_B 320. As explained, Module_A 310 cannot directly communicate data to Module_B 330 because they are associated with different domains.

In one embodiment, Module_A 310 incorporates the data to be communicated as a text string, and this payload data is added 420 to the URL reference of the second transport module 340. As mentioned, any module may be referenced by a URL reference, which may incorporate variable information. In one embodiment, the URL reference may include a hashing symbol "#" and append variable information ("payload") to the URL. This portion of the URL following the hashing symbol may be referred to as the fragment ID or the anchor of the URL. While a hashing symbol is shown and described, any other mechanism to incorporate the variable information and/or parameters into the URL may be used, such as, for example, through a filename, directory path, or subdomain name in the URL. Accordingly, in one embodiment, Module_A 310 communicates the payload by setting 420 the URL reference of the second transport module 340. For example, Module_A 310 may prepare the payload data and embed it in the URL associated with the second transport module 340 in the form: http://b.com/path#<payload data>.

The size of the payload may be limited by a particular browser program being used. For example, a typical browser may limit the URL to 4 kilobytes, so the payload is limited by that much less the size of the beginning portion of the URL. Even without an externally enforced limit, an embodiment of the invention may limit the size of the payload (or URL). For example, too large a payload (e.g., greater than 10 kilobytes) may result in high latency. The setting of these parameters will depend on the application of the communication techniques described herein.

In a typical embodiment, Module_B 320 will not necessarily know when the second transport module 340 has payload data that Module_B 320 can read. Accordingly, in one embodiment, Module_B 320 polls 440 the second transport module 340 to check if it has any new payload data. As illustrated in FIG. 4, Module_B 320 may poll 440 the second transport module 340 periodically, and this polling may be at regular intervals. Alternatively, the frequency of polling can be adjusted dynamically based on how recent the last payload arrived. For example, the polling may be more frequent following a transfer of payload data, as it may be considered more likely that additional data will be sent following the arrival of other data. It can be appreciated that the maximum polling interval can be set or otherwise constrained by the allowable latency in the communication, while too frequent polling can undesirably drain computing resources.

Once Module_B 320 polls 440 the second transport module 340 and determines that it has obtainable payload data, Module_B 320 reads 450 the payload data from the URL reference of the second transport module 340. In this way, communication of this payload data from a module of domain a.com to a module of domain b.com has been achieved.

In one embodiment, to enable further communication from Module_A 310 to Module_B 320, the process described above may be repeated. In addition, Module_B 320 may communicate data to Module_A 310 in the reverse direction, for example, by setting the URL reference of the first transport module 330. Such a communication may be used for substantive data transfer or just to send an acknowledgement message that the payload has been received. To enable it to receive data, Module_A 310 may poll 470 the first transport module 330 to check whether it has been loaded with new data.

By repeating the process described above, Module_A 310 and Module_B 320 can communicate in either direction. In one embodiment, where multiple payloads are communicated, the modules track the messages by labeling each payload with a sequence number. Additionally, the container document may contain modules from other domains as well. In such a case, there may be one or more transport modules initially associated with those other domains, allowing the modules from the other domains to communicate as well.

Alternative Environments

It is noted that the processes and systems described herein may be used in other contexts and environments within the scope of the invention. For example, the container document may comprise a page generated from a hosted page creator (e.g., geocities.com or pages.google.com, etc.). In this context, an IFRAME in a page being created or previously created may include a module (e.g., a plugin) that is maintained on a domain different from the hosted page creator domain and the module may then utilize an IFRAME to generate content that permits modification of the page being created for the hosted page creator may reference include an IFRAME that permits modification of the page being created or already created in a safe manner.

Further, an IFRAME that wraps the code also may be invisible to the user on the container document (e.g., webpage). As a result, using this technique, user interaction may be eliminated, in one exemplary iteration, to employ the IFRAME in an IFRAME technique described herein.

In another example, any web page (e.g., personal, corporate, educational, etc.) may use the IFRAME within an IFRAME method and system to include features or content from a third party while limiting the third party's ability to detect cookies on the server of the web page or create other security/privacy problems.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A method for facilitating communication between a first module and a second module in a browser application, the first module associated with a first domain, the second module associated with a second domain, the method comprising:
    creating a transport module associated with the second domain, the transport module having a Uniform Resource Locator reference;
    adding payload data from the first module associated with the first domain to a portion of the Uniform Resource Locator reference of the transport module;
    repeatedly polling the transport module by the second module, the polling comprising checking for the payload data, wherein a frequency of polling is dynamically adjusted based on whether a previous poll resulted in reading of a new payload; and
    reading the payload data by the second module associated with the second domain.

2. The method of claim 1, wherein the first and second modules comprise inline frames contained within a container document.

3. The method of claim 1, wherein the transport module comprises an empty inline frame.

4. The method of claim 1, wherein the payload data is added to a fragment ID following a hash symbol in the Uniform Resource Locator reference of the transport module.

5. The method of claim 1, further comprising:
    adding a second payload data from the second module to a portion of a Uniform Resource Locator reference of a transport module associated with the first domain; and
    reading the second payload data in the transport module associated with the first domain by the first module.

6. The method of claim 1 further comprising:
    creating a sequence of payloads from the first module associated with the first domain, each payload in the sequence of payloads associated with a sequence number, the sequence number indicating a position of a payload in the sequence; and
    transmitting the sequence of payloads one payload at a time to the second module by adding each payload in the sequence and a corresponding sequence number to the Uniform Resource Locator reference of the transport module.

7. A computer program product for facilitating communication between a first module and a second module in a browser application, the first module associated with a first domain, the second module associated with a second domain, the computer program product comprising a computer-readable storage medium containing computer program code for performing the method comprising:
    creating a transport module associated with a second domain, the transport module having a Uniform Resource Locator reference;
    adding payload data from the first module associated with the first domain to a portion of the Uniform Resource Locator reference of the transport module;
    repeatedly polling the transport module by the second module, the polling comprising checking for the payload data, wherein a frequency of polling is dynamically adjusted based on whether a previous poll resulted in reading of a new payload; and
    reading the payload data by the second module associated with the second domain.

8. The computer program product of claim 7, wherein the first and second modules comprise inline frames contained within a container document.

9. The computer program product of claim 7, wherein the transport module comprises an empty inline frame.

10. The computer program product of claim 7, wherein the payload data is added to a fragment ID following a hash symbol in the Uniform Resource Locator reference of the transport module.

11. The computer program product of claim 7, further containing computer program code for:

adding a second payload data from the second module to a portion of a Uniform Resource Locator reference of a transport module associated with the first domain; and reading the second payload data in the transport module associated with the first domain by the first module.

* * * * *